(12) United States Patent
Trindl

(10) Patent No.: US 11,292,149 B2
(45) Date of Patent: Apr. 5, 2022

(54) COMPOSITION FOR REPAIRING FINISHED WOOD PRODUCTS

(71) Applicant: Eric Trindl, Evergreen, CO (US)

(72) Inventor: Eric Trindl, Evergreen, CO (US)

( * ) Notice: Subject to any disclaimer, the term of this patent is extended or adjusted under 35 U.S.C. 154(b) by 255 days.

(21) Appl. No.: 16/402,374

(22) Filed: May 3, 2019

(65) Prior Publication Data

US 2019/0344467 A1    Nov. 14, 2019

Related U.S. Application Data

(60) Provisional application No. 62/671,058, filed on May 14, 2018.

(51) Int. Cl.
*B27K 5/02* (2006.01)
*C09D 191/00* (2006.01)

(52) U.S. Cl.
CPC ............. *B27K 5/02* (2013.01); *C09D 191/00* (2013.01)

(58) Field of Classification Search
CPC ...... B27K 5/02; C08L 2205/03; C09D 191/00
See application file for complete search history.

(56) References Cited

U.S. PATENT DOCUMENTS

| 2,052,391 | A | * | 8/1936 | Endres | ................. | C09D 115/00 |
| | | | | | | 524/575.5 |
| 2,996,397 | A | * | 8/1961 | Secker, Jr. | .......... | C09B 67/0084 |
| | | | | | | 106/253 |
| 3,837,875 | A | * | 9/1974 | Murphy | .................. | C08L 91/00 |
| | | | | | | 106/264 |
| 5,320,670 | A | * | 6/1994 | Foster | ...................... | C09D 5/06 |
| | | | | | | 106/251 |
| 6,011,097 | A | * | 1/2000 | Fels, Jr. | ................... | C09D 5/06 |
| | | | | | | 106/252 |
| 2019/0084182 | A1 | * | 3/2019 | Zhang | ................. | A01N 43/653 |

* cited by examiner

*Primary Examiner* — Shuangyi Abu Ali
(74) *Attorney, Agent, or Firm* — Greer, Burns & Crain, Ltd.

(57) ABSTRACT

A new composition has been invented which for restores the appearance of finished wood surfaces. The composition includes between 20 and 40%, by volume, of at least two oils; between 60 and 80%, by volume, of an organic, nonpolar solvent; and, at least two colorants, with a first colorant comprising about twice, by volume of a second colorant. The at least two oils may be any combination of tung oil, boiled linseed oil, and, olive oil, preferably all three are present. The organic, nonpolar solvent may be high grade mineral spirits. The first colorant may be yellow oxide and the second colorant may be raw umber.

14 Claims, No Drawings

COMPOSITION FOR REPAIRING FINISHED WOOD PRODUCTS

RELATED APPLICATIONS

This application claims priority to U.S. Provisional Application No. 62/671,058, filed on May 14, 2018, the entirety of which is incorporated herein by reference.

FIELD OF THE INVENTION

This invention relates generally to a composition for repairing finished woods surfaces, and more particularly to a liquid composition for restoring the appearance of non-painted, finished wood surfaces.

BACKGROUND OF THE INVENTION

Finished wood surfaces are very popular as, for example, doors, cabinets, furniture, flooring, trim to cover mounting structures for doors and windows of a building, such as a house. While some of the wood is painted, covering the grains, sometimes the wood is stained to highlight the grains in the wood, or the wood is used without any staining. Eventually, however the wood will become damaged with scratches, dents, compressions, other demarcations and general breakdown of topcoat finish on the surfaces of the wood.

Presently, in order to repair such damage, the wood may be stripped and re-stained. However, this method is time consuming, messy, requires professional labor, and often uses caustic stripping compositions. It is also known to replace the damaged wood. However, it can be difficult to match new wood with old wood. Additionally, replacing all of the wood is costly (both for material and labor requiring a carpenter and painter), time consuming, intrusive, and environmentally unfriendly.

Therefore, there remains a need for a process for effectively and efficiently repairing finished woods surfaces which is not as time consuming, costly, and is more environmentally friendly than existing solutions.

SUMMARY OF THE INVENTION

A new composition has been invented which restores the appearance of finished wood surfaces. The same composition is able to be applied to differently finished wood surfaces and provides a final finish that matches the surrounding finish already on the wood. Thus, the present composition works with darker, oil-based wood treatments, as well as lighter and unstained wood surfaces. Additionally, the present composition, also works on some water-based finishes. Finally, the present composition does not suffer from the drawbacks of the currently employed solutions—it is fast and easy to apply, relatively environmentally friendly, and is not as costly.

Accordingly, in a first aspect, the present invention may be characterized as providing a composition for restoring finished wood surfaces which includes: between 20 and 40%, by volume, of at least two oils; between 60 and 80%, by volume, of an organic, nonpolar solvent; and, at least two colorants, with a first colorant comprising about twice, by volume of a second colorant.

It is contemplated that the composition includes: between 25 and 35%, by volume, of the at least two oils; and, between 65 and 75%, by volume, of the organic, nonpolar solvent.

It is further contemplated that the composition includes: approximately 30%, by volume, of the at least two oils; and, approximately 70%, by volume, of the organic, nonpolar solvent.

The organic, nonpolar solvent may be mineral spirits. The mineral spirits may be high grade mineral spirits.

The at least two oils may be selected from the group consisting of: tung oil; boiled linseed oil; and olive oil. The at least two oils may include tung oil, boiled linseed oil, and, olive oil. The tung oil, the boiled linseed oil, and, the olive oil may be present in inequal amounts. The composition may include between 15 and 20%, by volume, of the tung oil; between 5 and 10%, by volume, of the boiled linseed oil; and between 1 and 4%, by volume, of the olive oil.

The at least two colorants may be raw umber and yellow oxide. The yellow oxide may be the first colorant. The composition may again include between 15 and 20%, by volume, of the tung oil; between 5 and 10%, by volume, of the boiled linseed oil; and between 1 and 4%, by volume, of the olive oil. The composition may include approximately 70%, by volume, of the organic, nonpolar solvent. Again, the organic, nonpolar solvent may be mineral spirits. The mineral spirits may be high grade mineral spirits.

In at least one aspect, the present invention may be considered as providing a composition for restoring finished wood surfaces which includes: between 15 and 20%, by volume, of tung oil; between 5 and 10%, by volume, of boiled linseed oil; and between 1 and 4%, by volume, of olive oil; between 60 and 80%, by volume, of mineral spirits; and, at least two colorants at least two colorants, with a first colorant comprising about twice, by volume, of a second colorant.

In at least one aspect, the present invention may be considered as providing a composition for restoring finished wood surfaces having: approximately 17%, by volume, of tung oil; approximately 8.7%, by volume, of boiled linseed oil; and approximately 2.3%, by volume, of olive oil; between 60 and 80%, by volume, of mineral spirits; and, at least two colorants, with a first colorant comprising about twice, by volume of a second colorant, wherein yellow oxide comprises the first colorant and raw umber comprises the second colorant.

Additional aspects, embodiments, and details of the invention, all of which may be combinable in any manner, are set forth in the following detailed description of the invention.

DETAILED DESCRIPTION OF THE INVENTION

As mentioned above, a new composition for restoring the appearance of finished wood surfaces has been invented. The present compassion, in a most preferred embodiment, is a liquid including seven (7) different components. It is used on wood surfaces that are finished with solvent based topcoats (Oil Based Lacquers, Oil Based Polyurethanes, Oil Based Varnishes) to alleviate scratches, other demarcations and general breakdown of topcoat finish on these surfaces. The solution works on either stained or unstained finished wood with a solvent based topcoat and is also effective on water based and waterborne clear coat finishes.

One or more embodiments of the present invention will now be described with the understanding that the following description is not intended to be limiting. Generally, the present composition comprises between 20 and 40%, by volume, of at least two oils; between 60 and 80%, by volume, of an organic, nonpolar solvent; and, at least two colorants. As used herein, the "by volume" refers to the relationship relative amounts of the oils to solvent and is based on the volume of the composition based on the amounts of the oils and solvent and not including any colorants or additional additives.

Oils

As noted above, the composition includes between 20 and 40%, by volume, of at least two oils, preferably between 25 and 35%, by volume, of the at least two oils and, most preferably approximately 30%, by volume, of the at least two oils. The oils are selected from the group consisting of: tung oil; boiled linseed oil; and olive oil.

In a preferred embodiment, the tung oil, the boiled linseed oil, and the olive oil are all present in the composition, preferably, in nonequal amounts in the composition. According to one aspect, the composition includes between 15 and 20%, by volume, of the tung oil, between 5 and 10%, by volume, of the boiled linseed oil, and between 1 and 4%, by volume, of the olive oil. In a most preferred composition, the composition includes approximately 17%, by volume, of tung oil, approximately 8.7%, by volume, of boiled linseed oil, and approximately 2.3%, by volume, of olive oil. Based on qualitative testing, it is believed that this ratio of these oils is important for protecting the finish on the wood.

Solvent

As noted above, the composition also includes between 60 and 80%, by volume, of an organic, nonpolar solvent. The solvent, in addition to acting as a carrier for the oils, will dissolve the existing coatings on the wood that the composition is applied to, allowing the oils to soak into the wood and dry to form a protective barrier. Preferably, the composition has approximately 70%, by volume, of the organic, nonpolar solvent. It has been found through qualitative testing that this ratio is important for the overall applicable of the present composition. If the amount of solvent is too low, the composition will not the not penetrate the wood. Additionally, if the amount of solvent is too high, the composition will not work.

With respect to the specific organic, nonpolar solvents that may be used, preferably, the organic, nonpolar solvent is a mineral spirit, and most preferably, the mineral spirits are high grade mineral spirits. It has been determined that a higher-grade mineral spirits dissolved the existing coatings on the wood better, making the composition more effective.

Colorant

The composition of the present invention includes at least two colorants to allow the composition to work on a variety of differently colored and stained woods varieties. Preferably, the colorants are raw umber and yellow oxide and are universal, and do not include a glycol, propylene, or formaldehyde carrier. The yellow oxide colorant provides the composition with tints that blend with natural woods and lighter stains. The raw umber provides the composition with tints that blend with darker stains. Therefore, too much of the raw umber results in the composition not blending well with lighter and natural stained materials.

Preferably the composing includes $6/32$ (per 2.3 L) of the raw umber and $12/32$ of the yellow oxide (per 2.3 L). It is believed that the twice the amount of the yellow oxide as raw umber provides the most flexible results, and the amount of raw umber may be between $4/32$ and $10/32$. Excess raw umber will not provide as good of a tint, therefore, it is preferred, but necessarily required, that the raw umber not exceed the $10/32$ of the yellow oxide (per 2.3 L) noted above.

Additional Components

Additionally, components may be included, for example, in one embodiment, 1 teaspoon (per 2.3 L) of turpentine was added to improve the compositions ability to dissolve the existing sealant on the wood. Other similar compounds may be added without overly impacting the effectiveness of the present composition.

In Use

A liberal amount of the composition is applied, using a rag, over the affected areas until the damaged wood is saturated. The re-colorization of the wood is almost immediately apparent. After 5-10 minutes, allowing the composition to fully dissolve the existing coating and penetrate the wood, the surface of the wood may be wiped with a clean, dry cotton rag. Once dried the surface of the wood will not appears as damaged and will not show a discernable different coloring from the treatment with the composition.

The present composition is able to be applied to differently tinted wood surfaces and provides a tint that matches the surrounding tint already on the wood and does not suffer from the drawbacks of the currently employed solutions—it is fast and easy to apply, relatively environmentally friendly, and is not as costly.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

What is claimed is:

1. A composition for restoring finished wood surfaces, the composition comprising:
   between 21 and 40%, by volume, of at least three oils;
   between 60 and 79%, by volume, of an organic, nonpolar solvent; and,
   at least two colorants, with a volume of a first colorant comprising twice a volume of a second colorant,
   wherein the at least three oils comprise:
   between 15 and 20%, by volume, of the tung oil;
   between 5 and 10%, by volume, of the boiled linseed oil; and
   between 1 and 4%, by volume, of the olive oil.

2. The composition of claim 1 further comprising:
   between 25 and 35%, by volume, of the at least three oils; and,
   between 65 and 75%, by volume, of the organic, nonpolar solvent.

3. The composition of claim 1 further comprising:
   30%, by volume, of the at least three oils; and,
   70%, by volume, of the organic, nonpolar solvent.

4. The composition of claim 1 wherein the at least two colorants are raw umber and yellow oxide.

5. The composition of claim 4, wherein the first colorant comprises yellow oxide.

6. A composition for restoring finished wood surfaces, the composition comprising:
   between 15 and 20%, by volume, of tung oil;
   between 5 and 10%, by volume, of boiled linseed oil; and
   between 1 and 4%, by volume, of olive oil;
   between 60 and 79%, by volume, of mineral spirits; and,
   at least two colorants, with a volume of a first colorant comprising twice a volume of a second colorant.

7. The composition of claim 6 wherein the mineral spirits comprise high grade mineral spirits.

8. A composition for restoring finished wood surfaces, the composition comprising:
   17%, by volume, of tung oil;
   8.7%, by volume, of boiled linseed oil; and
   2.3%, by volume, of olive oil;
   between 60 and 72%, by volume, of mineral spirits; and,
   at least two colorants, with a volume of a first colorant comprising twice a volume of a second colorant,
   wherein the first colorant comprises yellow oxide and the second colorant comprises raw umber.

9. The composition of claim 1, further comprising turpentine.

10. The composition of claim 6, wherein the at least two colorants are raw umber and yellow oxide.

11. The composition of claim 6, wherein the first colorant comprises yellow oxide.

12. The composition of claim 6, further comprising turpentine.

13. The composition of claim 8, wherein the mineral spirits comprise high grade mineral spirits.

14. The composition of claim 8, further comprising turpentine.

\* \* \* \* \*